US011559134B2

(12) United States Patent
Uchida et al.

(10) Patent No.: US 11,559,134 B2
(45) Date of Patent: Jan. 24, 2023

(54) CLEANER HEAD, REMOVING APPARATUS, AND REMOVING METHOD

(71) Applicant: KABUSHIKI KAISHA TOSHIBA, Minato-ku (JP)

(72) Inventors: Kenya Uchida, Yokohama (JP); Yuma Kikuchi, Kashiwazaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 767 days.

(21) Appl. No.: 16/460,196

(22) Filed: Jul. 2, 2019

(65) Prior Publication Data

US 2020/0085182 A1 Mar. 19, 2020

(30) Foreign Application Priority Data

Sep. 18, 2018 (JP) .............................. JP2018-174210

(51) Int. Cl.
*A46B 15/00* (2006.01)
*A46B 13/00* (2006.01)

(52) U.S. Cl.
CPC ........ *A46B 15/0053* (2013.01); *A46B 13/001* (2013.01); *A46B 2200/3073* (2013.01)

(58) Field of Classification Search
CPC ............ A46B 13/001; B08B 9/02; B08B 1/04
See application file for complete search history.

(56) References Cited

U.S. PATENT DOCUMENTS

| 5,819,354 A * | 10/1998 | Alonso ..................... F28G 3/04 |
| | | 15/104.09 |
| 6,003,198 A * | 12/1999 | Stegens .................. A46B 13/02 |
| | | 15/179 |
| 10,135,050 B2 | 11/2018 | Uematsu et al. |
| 2017/0188694 A1* | 7/2017 | Wong ..................... A46B 7/042 |
| 2017/0362741 A1 | 12/2017 | Sakai |

FOREIGN PATENT DOCUMENTS

| CN | 1166386 A | 12/1997 |
| CN | 102551327 A | 7/2012 |
| CN | 107159607 A | 9/2017 |
| DE | 10 2004 061 515 B3 | 10/2005 |
| EP | 0 810 039 A2 | 12/1997 |
| JP | 7-39437 | 9/1995 |
| JP | 9-314072 A | 12/1997 |
| JP | 10-309541 A | 11/1998 |
| JP | 2002-8640 A | 1/2002 |
| JP | 4918415 | 4/2012 |

(Continued)

*Primary Examiner* — Michael D Jennings
(74) *Attorney, Agent, or Firm* — Maier & Maier, PLLC

(57) ABSTRACT

According to one embodiment, a cleaner head includes a first rotor, a second rotor, and a contact surface. The first rotor can be rotationally driven in a state where an outer peripheral surface of the first rotor is in contact with a sheet that includes organic fiber and is formed on a base, and can remove a part of the sheet from the base. The second rotor is arranged next to the first rotor in a direction along a rotation axis of the first rotor, and is rotated together with the first rotor in a state where the second rotor is not in contact with the sheet. The contact surface is in contact with an outer peripheral surface of the second rotor at a position away from the sheet around the rotation axis.

7 Claims, 5 Drawing Sheets

(56) References Cited

FOREIGN PATENT DOCUMENTS

| | | |
|---|---|---|
| JP | 4918416 | 4/2012 |
| JP | 2014-41817 | 3/2014 |
| JP | 2019-56189 | 4/2019 |
| TW | 201003757 A1 | 1/2010 |
| WO | WO 2017/155075 A1 | 9/2017 |

\* cited by examiner

CLEANER HEAD, REMOVING APPARATUS, AND REMOVING METHOD

CROSS-REFERENCE TO RELATED APPLICATIONS

This application is based upon and claims the benefit of priority from Japanese Patent Application No. 2018-174210, filed Sep. 18, 2018; the entire contents of which are incorporated herein by reference.

FIELD

Embodiments described herein relate to a cleaner head, a removing apparatus, and a removing method.

BACKGROUND

Electrode groups used for a secondary battery, for example, include an electrode group where a separator configured to insulate a positive electrode from a negative electrode is formed integrally with the positive electrode and/or the negative electrode. When manufacturing this electrode group, a sheet including organic fiber is formed on the surface of the electrode (the positive electrode and/or the negative electrode), by an electrospinning method, for example. The sheet including organic fiber is formed as a separator between the positive electrode and the negative electrode. In a case of forming a separator integrally with either one of the electrodes by the electrospinning method as described above, it is necessary to remove organic fiber from a portion of a current collector which does not support an active material, in other words, a portion where a current collecting tab is formed, after the formation of the sheet including organic fiber on the entire surface of the electrode by the electrospinning method. In this case, for example, a removing apparatus that includes a cleaner head is used. The organic fiber is removed from a part of the sheet by rotationally driving a rotating brush (rotor) in a state where brush bristles of the rotating brush mounted on the cleaner head are in contact with the sheet.

In the case of removing the organic fiber by the rotating brush (rotor) as described above, it is required that the organic fiber is appropriately removed only from a portion where the current collecting tab is formed, and that the organic fiber is not removed from a portion of the current collector which supports an active material. In other words, in a sheet formed on an electrode, it is required that the sheet (organic fiber) is appropriately removed only from a desired portion.

DETAILED DESCRIPTION

According to an embodiment, a cleaner head that includes a first rotor, a second rotor, and a contact surface is provided. The first rotor can be rotationally driven in a state where the outer peripheral surface of the first rotor is in contact with a sheet that includes organic fiber and is formed on the surface of a base. It is possible to remove a part of the sheet from the base by rotationally driving the first rotor in a state where the outer peripheral surface of the first rotor is in contact with the sheet. The second rotor is arranged next to the first rotor in the direction along the rotation axis of the first rotor. The second rotor is rotated together with the first rotor by the rotational drive of the first rotor in a state where the second rotor is not in contact with the sheet. The contact surface is in contact with the outer peripheral surface of the second rotor at a position away from the base and the sheet around the rotation axis. A part of or all of the sheet removed from the base and caught on the outer peripheral surface of the second rotor can be removed through the contact between the contact surface and the outer peripheral surface of the second rotor while the second rotor is rotating.

According to the embodiment, a removing apparatus that includes the aforementioned cleaner head and a dust collector is provided. The dust collector can collect the sheet removed from the base by the first rotor by making suction power act in the cleaner head.

According to the embodiment, a removing method of removing a part of a sheet that includes organic fiber and is formed on a base is provided. In the removing method, the part of the sheet is removed from the base by rotationally driving the first rotor while the outer peripheral surface of the first rotor is in contact with the sheet. In the removing method, the second rotor, which is arranged next to the first rotor in the direction along the rotation axis of the first rotor, is rotated together with the first rotor by the rotational drive of the first rotor in a state where the second rotor is not in contact with the sheet. In the removing method, the contact surface is in contact with the outer peripheral surface of the second rotor at a position away from the base and the sheet around the rotation axis while the second rotor is rotating. As a result, a part of or all of the sheet removed from the base and caught on the outer peripheral surface of the second rotor is removed.

Hereinafter, the embodiment will be described with reference to FIGS. 1 to 8.

First Embodiment

Figure 1:
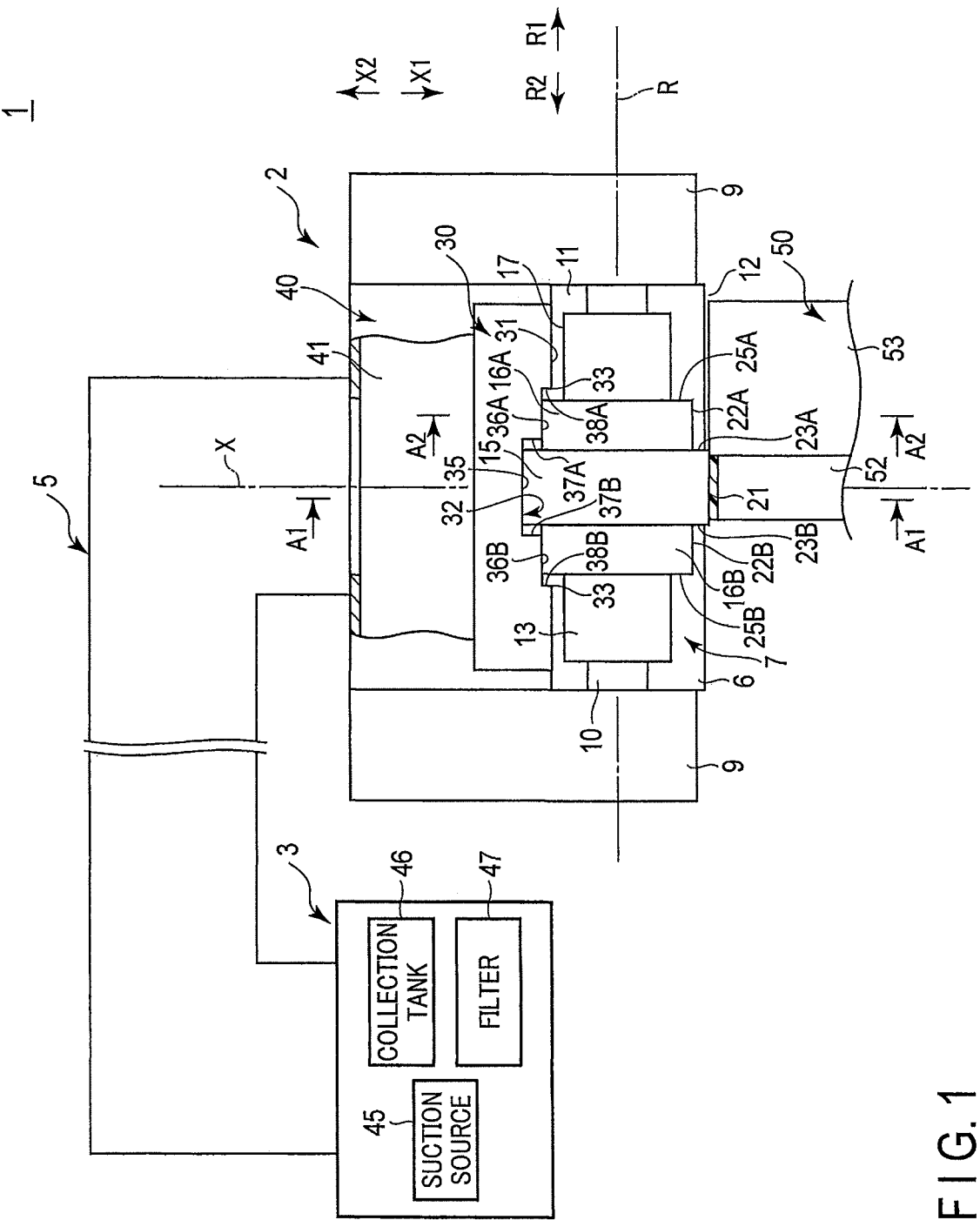
FIG. 1 is a schematic diagram showing a configuration of a removing apparatus according to a first embodiment.
Figure 2:
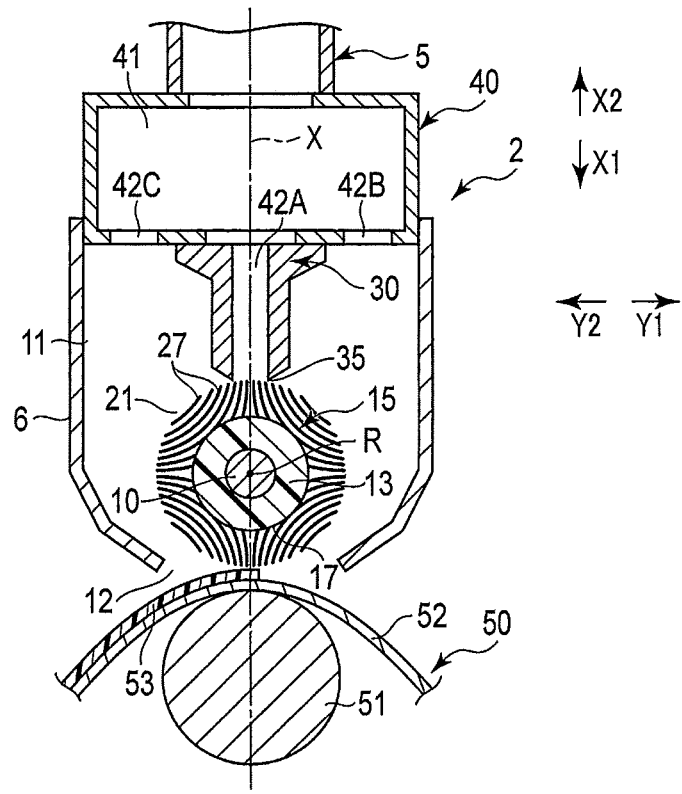
FIG. 2 is a cross-sectional view schematically showing a cross section taken along the line A1-A1 in FIG. 1.
Figure 3:
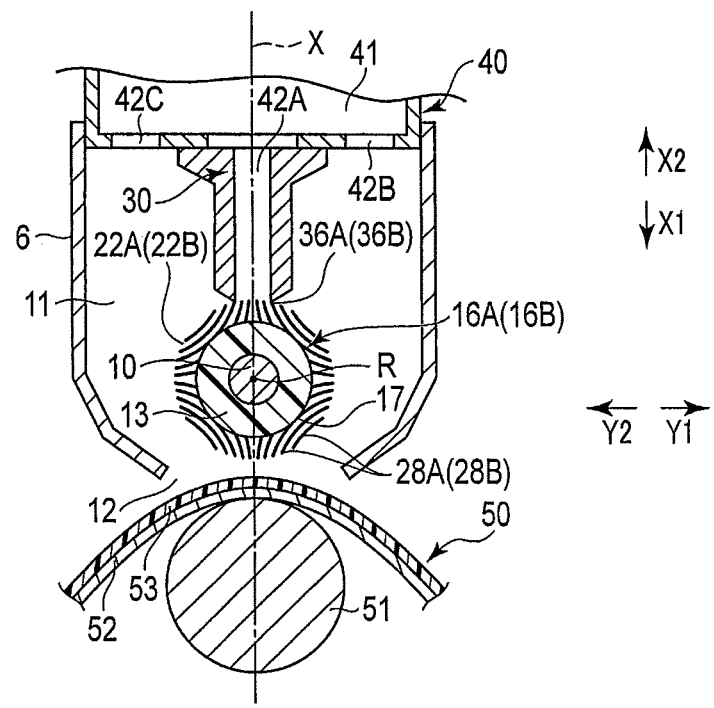
FIG. 3 is a cross-sectional view schematically showing a cross section taken along the line A2-A2 in FIG. 1.

FIG. 1 shows a removing apparatus (cleaner unit) 1 according to a first embodiment. FIG. 2 shows a cross section taken along the line A1-A1 in FIG. 1, and FIG. 3 shows a cross section taken along the line A2-A2 in FIG. 1. As shown in FIGS. 1 to 3, the removing apparatus (scraping device) 1 includes a cleaner head 2, a dust collector 3, and a duct 5 connecting the cleaner head 2 and the dust collector 3. The cleaner head 2 has a head axis X as the central axis. The cleaner head 2 includes an outer cover 6, a rotating unit (brush unit) 7, and a supporting member 9 supporting the rotating unit 7. The rotating unit 7 is attached to the supporting member 9 rotatably about a rotation axis R. The rotating unit 7 is attached to the supporting member 9 via a shaft 10, and rotates about the rotation axis R together with the shaft 10.

In the cleaner head 2, a storing space 11 is formed inside the outer cover 6. The storing space 11 is defined by the outer cover 6 and the supporting member 9. The rotating unit 7 is arranged in the storing space 11. The outer cover 6 has an opening 12 where the storing space 11 is open to the outside of the cleaner head 2. Relative to the cleaner head 2, the following description will specify a rotation axis direction along the rotation axis R (the direction indicated by arrows R1 and R2), a first intersecting direction (the direction indicated by arrows X1 and X2) intersecting with (perpendicular to or approximately perpendicular to) the rotation axis direction, and a second intersecting direction (the direction indicated by arrows Y1 and Y2) intersecting with (perpendicular to or approximately perpendicular to) both the rotation axis direction and the first intersecting direction. FIG. 1 shows the storing space 11 seen from one side of the second intersecting direction. FIGS. 2 and 3 show cross sections perpendicular to or approximately perpendicular to the rotation axis direction. The head axis X extends along the first intersecting direction, and the first intersecting direction matches or approximately matches the head axis direction along the head axis X. At the opening 12, the storing space 11 opens to one side (the side of the X1) of the first intersecting direction (the head axis direction).

The rotating unit 7 includes the rotation base 13, a rotor (first rotor) 15, and rotors (second rotors) 16A and 16B. The rotation base 13 is installed on the outer peripheral surface of the shaft 10. The rotor (rotating brush) 15 and the rotors 16A and 16B are arranged on the outer peripheral surface 17 of the rotation base 13. By the rotor 15 being rotationally driven, the rotors 16A and 16B rotate around the rotation axis R together with the rotation base 13, the rotor 15, and the shaft 10. The rotors 16A and 16B are arranged next to the rotor 15 in the rotation axis direction along the rotation axis R. The rotor 16A is arranged on one side (the side of arrow Y1) of the rotation axis direction with respect to the rotor 15, and the rotor 16B is arranged on the side (the side of arrow Y2) opposite to the rotor 16A with respect to the rotor 15 in the rotation axis direction. Accordingly, the rotor 15 is arranged between the rotors 16A and 16B according to the rotation axis direction. FIG. 2 shows a cross section through the rotor (first rotor) 15, and FIG. 3 shows a cross section through the rotor (second rotor) 16A. A cross section perpendicular to or approximately perpendicular to the rotation axis direction and passing through the rotor (second rotor) 16B is similar to the cross section shown in FIG. 3.

In the present embodiment, each of the rotors 16A and 16B is adjacent to the rotor 15 in the rotation axis direction. In one embodiment, however, each of the rotors 16A and 16B may be arranged slightly away from the rotor 15 in the rotation axis direction. In this case, a minute gap is formed between each of the rotors 16A and 16B and the rotor 15. Even if the rotors 16A and 16B are arranged away from the rotor 15 in the rotation axis direction, the gap distance of each of the rotors 16A and 16B from the rotor is minute; for example, smaller than the size of the rotor 15 in the rotation axis direction.

The outer diameter of the rotor 15 is larger than the outer diameter of each of the rotors 16A and 16B. Accordingly, a step surface 23A is formed between the outer peripheral surface 21 of the rotor 15 and the outer peripheral surface 22A of the rotor 16A by the rotor 15. A step surface 23B is formed between the outer peripheral surface 21 of the rotor 15 and the outer peripheral surface 22B of the rotor 16B by the rotor 15. On the rotor 15, the step surface 23A faces the side of the rotor 16A in the rotation axis direction. On the rotor 15, the step surface 23B faces the side of the rotor 16B in the rotation axis direction, and faces the side opposite to the side which the step surface 23A faces.

The outer diameter of each of the rotors 16A and 16B is larger than the outer diameter of the rotation base 13. Accordingly, a step surface 25A is formed between the outer peripheral surface 22A of the rotor 16A and the outer peripheral surface 17 of the rotation base 13 by the rotor 16A. Accordingly, a step surface 25B is formed between the outer peripheral surface 22B of the rotor 16B and the outer peripheral surface 17 of the rotation base 13 by the rotor 16B. On the rotor 16A, the step surface 25A faces the side opposite from the rotor 15 in the rotation axis direction. On the rotor 16B, the step surface 25B faces the side opposite from the rotor 15 in the rotation axis direction, and faces the side opposite to the side which the step surface 25A faces.

The outer peripheral surface 21 of the rotor 15 is formed of a flexible material, and is formed of a material which can remove, a sheet including organic fiber such as sheet 53 described below from a base such as base 52 described below. The material for forming the outer peripheral surface of the rotor (first rotor) 15 includes a brush, a sponge, a rubber roll, a nonwoven fabric, a fabric, and a paper roll, for example.

In one example shown in FIGS. 1 to 3, the rotor 15 is a rotating brush, and a plurality of (multiple) brush bristles (first brush bristles) 27 are provided on the outer peripheral surface 21 of the rotor 15. Each of the brush bristles 27 is formed of chemical fiber or animal fiber. The chemical fiber for forming the brush bristles 27 includes nylon, polypropylene, chloroethene, polyester, acrylic resin, aramid, and a fluorine resin such as Teflon. Animal fiber for forming the brush bristles 27 may be horse hair, pig bristles, sheep wool, and deer hair. Each of the brush bristles 27 has a wire diameter from 0.1 mm to 0.5 mm and a bristle length of 30 mm or less. Even if a wire diameter and a bristle length of each of the brush bristles 27 are within the above range, it is preferable that each of the brush bristles 27 of the rotor (rotating brush) 15 has a wire diameter larger than 0.2 mm, or that the ratio of the bristle length to the wire diameter is less than 50.

In one example shown in FIGS. 1 to 3, a plurality of (multiple) brush bristles (second brush bristles) 28A are provided on the outer peripheral surface 22A of the rotor 16A, and a plurality of (multiple) brush bristles (second brush bristles) 28B are provided on the outer peripheral surface 22B of the rotor 16B. Each of brush bristles 28A and 28B is preferably formed of the same material as the brush bristles 27, so as to save the trouble and cost in manufacture of the rotating unit 7. Each of brush bristles 28A and 28B preferably has the same or approximately the same wire diameter as the wire diameter of each of brush bristles 27, so as to save the trouble and cost in manufacture of the rotating unit 7. In one embodiment, each of the rotors 16A and 16B may be formed to have the same or approximately the same outer diameter as the outer diameter of the rotor 15.

It is not always necessary to provide the brush bristles 28A of the rotor 16A and the brush bristles 28B of the rotor 16B. In one embodiment, each of the outer peripheral surface 22A of the rotor 16A and the outer peripheral surface 22B of the rotor 16B may be formed of one of a sponge, a rubber roll, a nonwoven fabric, fabric, and a paper roll, for example.

A plate 30 is formed in the storing space 11 inside the cleaner head 2. The plate 30 is formed of metal, for example. The plate 30 is provided at a position (angular position) away from the opening 12 around the rotation axis R. In one example shown in FIGS. 1 to 3, the plate 30 is provided at a position (angular position) away from the opening 12 around the rotation axis R by 180° or approximately 180°. Accordingly, in the present embodiment, the plate 30 is arranged on the side opposite to the opening 12 with respect to the rotating unit 7 (the rotor 15 and the rotors 16A and 16B) according to the first intersecting direction. The plate 30 includes a plate facing surface 31 that faces the outer peripheral surface of the rotating unit 7. The plate facing surface 31 faces the outer peripheral surface of the rotating unit 7 at a position away from the opening 12 around the rotation axis R. In one example shown in FIGS. 1 to 3, the plate facing surface 31 faces the outer peripheral surface of the rotating unit 7 from the side opposite to the opening 12 in the first intersecting direction.

A groove 32 is formed on the plate facing surface 31 of the plate 30. The groove 32 is recessed on the side away from the rotation axis R, namely, the side away from the rotor 15 and the rotors 16A and 16B. On the plate 30, the groove 32 opens to the side close to the rotation axis R, namely, the side where the rotor 15 and the rotors 16A and 16B are located. An opening edge 33 of the groove 32 is formed on the plate facing surface 31. The rotor (first rotor) 15 and the rotor (second rotor rotor) 16A and 16B are inserted in the groove 32. However, the portion of the rotating unit 7 other than the rotor 15 and the rotors 16A and 16B is not inserted in the groove 32. Thus, the rotation base 13 is not inserted in the groove 32. There is a gap between the plate facing surface 31 and the outer peripheral surface of the rotating unit (brush unit) 7 on the portion other than the rotor 15 and the rotors 16A and 16B. Accordingly, there is a gap between the plate facing surface 31 and the outer peripheral surface 17 of the rotation base 13.

The portion of the rotor 15 and the rotors 16A and 16B which projects from the rotation base 13 to the outer peripheral side is inserted in the groove 32. The shape of the groove 32 corresponds to the portion of the rotor 15 and the rotors 16A and 16B which projects from the rotation base 13 to the outer peripheral side. Thus, the groove 32 is formed into a shape corresponding to the rotor 15 and the rotors 16A and 16B. The groove 32 has a contact surface 35 that is in contact with the outer peripheral surface 21 of the rotor 15. The contact surface 35 is in contact with the outer peripheral surface 21 (the brush bristles 27) of the rotor (first rotor) 15 in the groove 32. Accordingly, the outer peripheral surface 21 of the rotor 15 is in contact with the contact surface 35 at a position away from the opening 12 around the rotation axis R. In one example shown in FIGS. 1 to 3, the outer peripheral surface 21 (the brush bristles 27) is in contact with the contact surface at a position away from the opening 12 around the rotation axis R by 180° or approximately 180°.

The groove 32 also has a contact surface (first contact surface) 36A in contact with the outer peripheral surface 22A of the rotor 16A, and a contact surface (first contact surface) 36B in contact with the outer peripheral surface 22B of the rotor 16B. The contact surface 36A is in contact with the outer peripheral surface 22A (the brush bristles 28A) of the rotor 16A in the groove 32. The contact surface 36B is in contact with the outer peripheral surface 22B (the brush bristles 28B) of the rotor 16B in the groove 32. Accordingly, the outer peripheral surface 22A of the rotor 16A is in contact with the contact surface 36A at a position away from the opening 12 around the rotation axis R, and the outer peripheral surface 22B of the rotor 16B is in contact with the contact surface 36B at a position away from the opening 12 around the rotation axis R. In one example shown in FIGS. 1 to 3, each of the contact surfaces 36A and 36B is in contact with the corresponding one of the outer peripheral surface 22A of the rotor 16A and the outer peripheral surface 22B of the rotor 16B at a position away from the opening 12 by 180° or approximately 180° around the rotation axis R. The contact surface (first contact surface) 36A is arranged on one side relative to the contact surface (second contact surface) 35 in the rotation axis direction, and the contact surface (first contact surface) 36B is arranged on the side opposite to the contact surface 36A with respect to the contact surface (second contact surface) 35 along the rotation axis direction. Accordingly, the contact surface (second contact surface) 35 is provided at a different portion from the contact surfaces (first contact surfaces) 36A and 36B.

The depth of the groove 32 at the contact surface 35 is larger than the depth of the groove 32 at each of the contact surfaces 36A and 36B. Thus, in the groove 32, a step surface 37A is formed between the contact surface 35 and the contact surface 36A. A step surface 37B is formed between the contact surface 35 and the contact surface 36B. The step surface 37A is continuously extended from the contact surface 35 to the contact surface 36A, and the step surface 37B is continuously extended from the contact surface 35 to the contact surface 36B. The step surface 37A faces the step surface 23A of the rotor 15 from the side where the rotor 16A is located. The step surface 37B faces the step surface 23B of the rotor 15 from the side where the rotor 16B is located. Accordingly, in the groove 32, the rotor 15 is arranged between the step surfaces 37A and 37B in the rotation axis direction. However, the step surface 37A is not in contact with the rotor 15, and there is a gap between the step surface 37A and the step surface 23A of the rotor 15. The step surface 37B is not in contact with the rotor 15, and there is a gap between the step surface 37B and the step surface 23B of the rotor 15.

In the groove 32, a groove side surface 38A is continuously extended from the contact surface 36A to the opening edge 33 of the groove 32. In the groove 32, a groove side surface 38B is continuously extended from the contact surface 36B to the opening edge 33 of the groove 32. The groove side surface 38A faces the step surface 25A of the rotor 16A from the side opposite to the rotor 15. The groove side surface 38B faces the step surface 25B of the rotor 16B from the side opposite to the rotor 15. Thus, in the groove 32, the rotor 16A is arranged between the groove side surface 38A and the rotor 15 according to the rotation axis direction. In the groove 32, the rotor 16B is arranged between the groove side surface 38B and the rotor 15 according to the rotation axis direction. The groove side surface 38A is not in contact with the rotor 16A, and there is a gap between the groove side surface 38A and the step surface 25A of the rotor 16A. The groove side surface 38B is not in contact with the rotor 16B, and there is a gap between the groove side surface 38B and the step surface 25B of the rotor 16B.

A relay member 40 is connected to the plate 30. The relay member 40 is connected to the plate 30 from the side opposite to the rotating unit 7 in the first intersecting direction (the head axis direction). A relay space 41 is formed inside the relay member 40. The storing space 11 communicates with the relay space 41 via the flow paths 42A, 42B, and 42C. The flow paths 42A to 42C are respectively extended along the first intersecting direction (the direction indicated by arrows X1 and X2). The flow path 42A is formed through the inside of the plate 30. The flow path 42B is located on one side of the second intersecting direction (the direction indicated by arrows Y1 and Y2) relative to the flow path 42A. The flow path 42C is located on the side opposite to the flow path 42B with respect to the flow path 42A in the second intersecting direction. Each of the flow paths 42A to 42C has a dimension (width) of 2 mm or more in the second intersecting direction at any portion. Each of the flow paths 42A to 42C has a dimension (width) of 2 mm or more in the rotation axis direction (the direction indicated by arrows R1 and R2) at any portion.

In the removing apparatus 1, one end of the duct 5 is connected to the relay member 40 of the cleaner head 2. The inside of the duct 5 communicates with the relay space 41. The other end of the duct 5 is connected to the dust collector 3. The dust collector 3 includes a suction source 45 including a suction pump, a collection tank 46, and a filter 47. Suction force acts in the cleaner head 2 by actuating the suction source 45. In the present embodiment, by actuating the suction source 45, suction force from the opening 12 to the storing space 11 acts and suction force from the storing space 11 to the suction source 45 acts in the removing apparatus 1 that includes the cleaner head 2. This generates a flow of gas from the opening 12 toward the suction source 45 through the storing space 11, one of the flow paths 42A to 42C, the relay space 41, and the inside of the duct 5 in this order. In this way, suction using the removing apparatus (scraping device) 1 is performed. The aspirate as a result of the suction is collected into the collection tank 46. A filter 47 is arranged between the duct 5 and the suction source 45. The filter 47 prevents the aspirate from flowing into the suction source 45, and only gas (air) flows into the suction source 45.

Furthermore, the width and the cross-sectional area of the suction path from the opening 12 to the dust collector 3 are the smallest in each of the flow paths 42A to 42C. Accordingly, the width of the suction path from the opening 12 to the dust collector 3 is 2 mm or more at any portion.

In the system using the removing apparatus 1, a conveying roller 51 is provided. The conveying roller 51 forms a part of a conveying apparatus, and the processing target 50 by the removing apparatus 1 is conveyed by the conveying apparatus.

Next, the processing target 50 by the removing apparatus 1 will be described. In the processing target 50, a sheet 53 including organic fiber is formed on the surface of the base 52. The sheet 53 is formed on the surface of the base 52 by, for example, an electrospinning method using a spinning head (not shown). In the electrospinning method, a solution in which an organic material dissolves in a solvent is filled inside the spinning head. A voltage (high voltage) is applied between the spinning head and the base 52, which leads to ejection of the solution of the organic material from the nozzle of the spinning head to the surface of the base 52. As a result, a sheet (layer) 53 including organic fiber is formed on the surface of the base 52. The sheet 53 is an insulating layer having an electrical insulation property.

As an organic material to be filled in the spinning head, one or more of polyolefin, polyether, polyimide, polyketone, polysulfone, cellulose, polyvinyl alcohol (PVA), polyamide, polyamide-imide, and polyvinylidene fluoride (PVdf) are selected, for example. Polyolefin includes polypropylene (PP) and polyethylene (PE), for example. Inside the spinning head, the organic material is dissolved in a concentration from 5% by mass to 60% by mass in a solvent. As a solvent in which the organic material is dissolved, a given solvent such as dimethylacetamide (DMAc), dimethylsulfoxide (DMSO), N,N-dimethylformamide (DMF), N-methylpyrrolidone (NMP), water, and alcohol, for example, is used. If the organic material has low solubility, the organic material in a sheet-like shape may be melted by laser, for example, while performing the electrospinning method. In the solution of the organic material, an organic solvent having a high boiling point may be mixed with a solvent having a low melting point.

The voltage between the spinning head and the base 52 is appropriately determined in correspondence with the kind of the solvent and the solute, the boiling point and the vapor pressure curve of the solvent, the solution concentration, the temperature, the shape of the nozzle of the spinning head, and the distance between the base 52 and the nozzle of the spinning head, for example, and is appropriately determined within, for example, 1 kV to 100 kV. The supply speed of the solution of the organic material is appropriately determined in correspondence with the solution concentration, the solution viscosity, the temperature, the pressure, the applied voltage, and the shape of the nozzle of the spinning head, for example.

Formation of the sheet 53 including organic fiber, namely, spinning of organic fiber on the surface of the base 52 may be performed by a method other than electrospinning. For example, the sheet 53 including organic fiber may be formed on the surface of the base 52 by one of the ink-jet method, the jet-dispenser method, and the splay-application method, instead of the electrospinning method.

The processing target 50 where the sheet 53 including organic fiber is formed on the base 52 by spinning of the electrospinning method, for example, is conveyed to the removing apparatus (scraping device) 1 by the conveying apparatus including the conveying roller 51. Then, the processing by the removing apparatus 1 is performed.

When performing the processing by the removing apparatus 1, the outer peripheral surface 21 (brush bristles 27) of the rotor 15 is brought into contact with the sheet 53, which includes organic fiber and is formed on the surface of the base 52. At this time, the rotor (first rotor) 15 comes into contact with the sheet 53 at the opening 12 of the storing space 11. Then, with the outer peripheral surface 21 of the rotor 15 being in contact with the sheet 53, the rotating unit 7 including the rotor (first rotor) 15 and the rotors (second rotor) 16A and 16B is rotated about the rotation axis R so as to rotationally drive the rotor 15. The organic fiber on the sheet 53 is removed (scraped off) by the rotational drive of the rotor 15. In the present embodiment, organic fiber is removed from a part of the sheet 53 by the rotor 15. Accordingly, in the processing target 50 even after the processing by the removing apparatus 1 is completed, the sheet 53 including organic fiber is still formed on a portion of the surface of the base 52 which is not subjected to the removal by the rotor 15.

In the cleaner head 2, the sheet 53 removed from the base 52 may be caught on the outer peripheral surface 21 (brush bristles 27) of the rotor 15. In the present embodiment, the contact surface (second contact surface) 35 is in contact with the outer peripheral surface 21 (brush bristles 27) of the rotor 15 at a position away from the opening 12 around the rotation axis R, namely, a position away from the base 52 and the sheet 53 around the rotation axis R. Thus, a part of or all of the organic fiber (sheet 53) removed from the base 52 and caught on the outer peripheral surface 21 (brush bristles 27) of the rotor 15 is removed through the contact between the contact surface 35 and the outer peripheral surface 21 while the rotor 15 is rotating.

The organic fiber (sheet 53) removed from the base 52 and the organic fiber (sheet 53) removed from the rotor 15 may be accumulated in the gap between the step surface 23A of the rotor (first rotor) 15 and the step surface 37A of the groove 32. The organic fiber removed (scraped off) from the sheet 53 may be caught directly on the outer peripheral surface 22A of the rotor 16A, and the organic fiber accumulated in the gap between the step surfaces 23A and 37A may be caught on the outer peripheral surface 22A of the rotor 16A. Similarly, the organic fiber (sheet 53) removed from the base 52 and the organic fiber (sheet 53) removed from the rotor 15 may be accumulated in the gap between the step surface 23B of the rotor 15 and the step surface 37B of the groove 32. The organic fiber removed from the sheet 53 may be caught directly on the outer peripheral surface 22B of the rotor 16B, and the organic fiber accumulated in the gap between the step surfaces 23B and 37B may be caught on the outer peripheral surface 22B of the rotor 163.

In the present embodiment, the contact surface (first contact surface) 36A is in contact with the outer peripheral surface 22A of the rotor 16A at a position away from the opening 12 around the rotation axis R, namely, a position away from the base 52 and the sheet 53 around the rotation axis R. Thus, a part of or all of the organic fiber (sheet 53) removed from the base 52 and caught on the outer peripheral surface 22A of the rotor 16A is removed through the contact between the contact surface 36A and the outer peripheral surface 22A of the rotor 16A while the rotor 16A is rotating together with the rotor 15. Similarly, in the present embodiment, the contact surface (first contact surface) 36B is in contact with the outer peripheral surface 22B of the rotor 16B at a position away from the opening 12 around the rotation axis R, namely, a position away from the base 52 and the sheet 53 around the rotation axis R. Thus, a part of or all of the organic fiber (sheet 53) removed from the base 52 and caught on the outer peripheral surface 22B of the rotor 16B is removed through the contact between the contact surface 36B and the outer peripheral surface 22B of the rotor 16B while the rotor 16B is rotating together with the rotor 15.

In the present embodiment, the outer diameter of the rotor 15 is larger than the outer diameter of each of the rotors 16A and 16B, as described above. Furthermore, the step surface 23A is formed between the outer peripheral surface 21 of the rotor 15 and the outer peripheral surface 22A of the rotor 16A, and the step surface 23B is formed between the outer peripheral surface 21 of the rotor 15 and the outer peripheral surface 22B of the rotor 16B. Because of such a configuration, the rotor 16A rotates together with the rotor (rotating brush) 15 without being in contact with the sheet 53 of the processing target 50. Similarly, the rotor 16B rotates together with the rotor 15 without being in contact with the sheet 53 of the processing target 50. This effectively prevents each of the rotors 16A and 16B from coming into contact with the sheet 53.

From the outer peripheral surface 22A of the rotor 16A and the outer peripheral surface 22B of the rotor 16B, the organic fiber caught thereon is removed as described above. Therefore, the organic fiber is prevented from being caught on the outer peripheral surface 22A of the rotor 16A and the outer peripheral surface 22B of the rotor 16B in large amounts, and the caught organic fiber is prevented from interfering with the sheet 53. This effectively prevents the sheet 53 from being removed by the organic fiber caught on the outer peripheral surface 22A of the rotor 16A. Similarly, the sheet 53 is effectively prevented from being removed by the organic fiber caught on the outer peripheral surface 22B of the rotor 16B.

As described above, in the present embodiment, the sheet 53 is prevented from being removed by the organic fiber caught on each of the rotors 16A and 16B. As a result, the organic fiber is appropriately removed only from a portion of the sheet 53 of the processing target 50 with which the outer peripheral surface 21 (brush bristles 27) of the rotor 15 comes into contact, namely, only from a desired portion of the sheet 53.

In the present embodiment, a gap is provided between the step surface 23A of the rotor 15 and the step surface 37A of the groove 32. Another gap is provided between the step surface 23B of the rotor 15 and the step surface 37B of the groove 32. In other words, the plate 30 formed of metal, for example, is separate from the rotor 15 in the rotation axis direction. Accordingly, the plate 30 is prevented from coming into contact with the brush bristles of the rotor 15 from the rotation axis direction. Increase in the life of the rotor 15 is achieved by the plate 30 not being in contact with the rotor 15 from the rotation axis direction while the rotor 15 is rotating.

In addition, when the rotor 15 is rotationally driven, the dust collector 3 is driven. As a result, the organic fiber removed by the rotor 15 is sucked from the opening 12 of the cleaner head 2 to the inside of the storing space 11. The organic fiber sucked into the storing space 11 is sucked and collected in the collection tank 46 of the dust collector 3. The organic fiber removed from the outer peripheral surface 21 (brush bristles 27) of the rotor 15 and the organic fiber removed from each of the outer peripheral surface 22A of the rotor 16A and the outer peripheral surface 22B of the rotor 16B are also sucked and collected in the collection tank 46 of the dust collector 3. At this time, the organic fiber moves from the storing space 11 to the dust collector 3 through one of the flow paths 42A to 42C, the relay space 41, and the inside of the duct 5 in this order. In the dust collector 3, the filter 47 prevents the organic fiber from flowing into the suction source 45.

As described above, the width of the suction path from the opening 12 to the dust collector 3 is 2 mm or more even in the narrowest flow paths 42A to 42C. By setting the width of the suction path to 2 mm or more at any portion from the opening 12 to the dust collector 3, the organic fiber is effectively prevented from accumulating in the suction path to the collection tank 46.

Usage Example of Removing Apparatus

Next, a usage example of the removing apparatus 1 (scraping device) will be described. The removing apparatus 1 of the aforementioned embodiment is used for forming an electrode group of a battery such as a nonaqueous electrolyte secondary battery and an alkaline secondary battery, and for forming a separator-integrated electrode in which a positive electrode and/or a negative electrode is integrated with a separator, for example.

Figure 4:
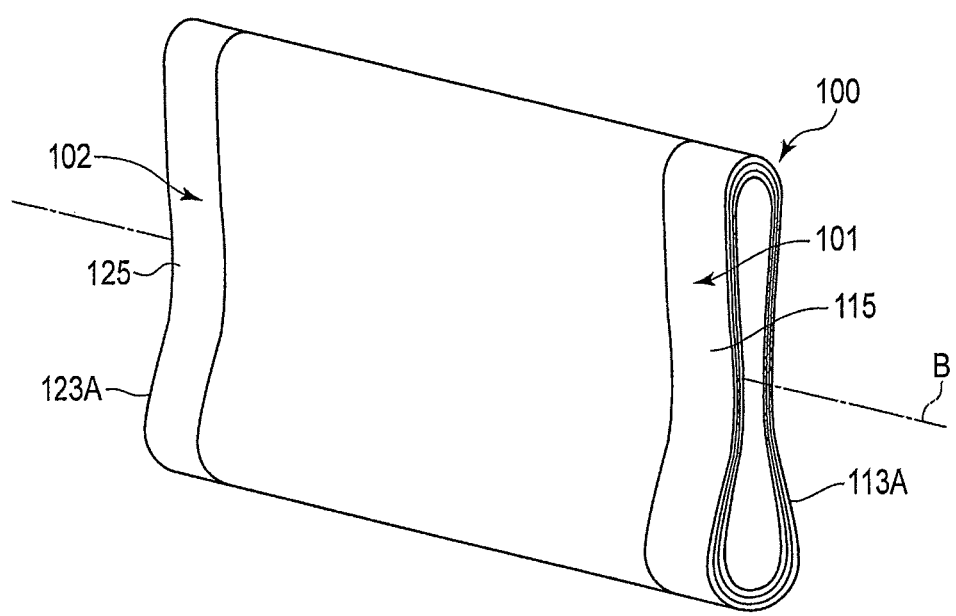
FIG. 4 is a schematic diagram showing an example of an electrode group that includes a separator-integrated electrode formed by using the removing apparatus according to the first embodiment.

FIG. 4 shows one example of an electrode group 100 having a separator-integrated electrode formed by using the removing apparatus 1. The electrode group 100 is provided in a battery such as a sealed nonaqueous electrolyte secondary battery, for example. In the battery, the electrode group 100 is stored inside an exterior covering member. Inside the exterior covering member, the electrode group 100 is impregnated with an electrolytic solution (not shown).

As an exterior covering member, either a bag-shape container made of a laminating film or a metal container may be used. The shape of the exterior covering member may be a flat shape, a rectangular shape, a cylindrical shape, a coin-like shape, a button-like shape, a sheet-like shape, and a laminated shape, for example. As a laminating film, a multi-layer film may be used, for example, and the multi-layer film may include a plurality of resin layers and a metal layer arranged between the resin layers. In this case, as a metal layer, for example, aluminum foil or aluminum alloy foil may be used, and as a resin layer, for example, a polymer material such as polypropylene (PP), polyethylene (PE), nylon, and polyethylene terephthalate (PET) may be used. The metal container is formed of at least one kind of metal selected from a group including, for example, aluminum, zinc, titanium, and iron, or is formed of an alloy of these metals.

Figure 5:
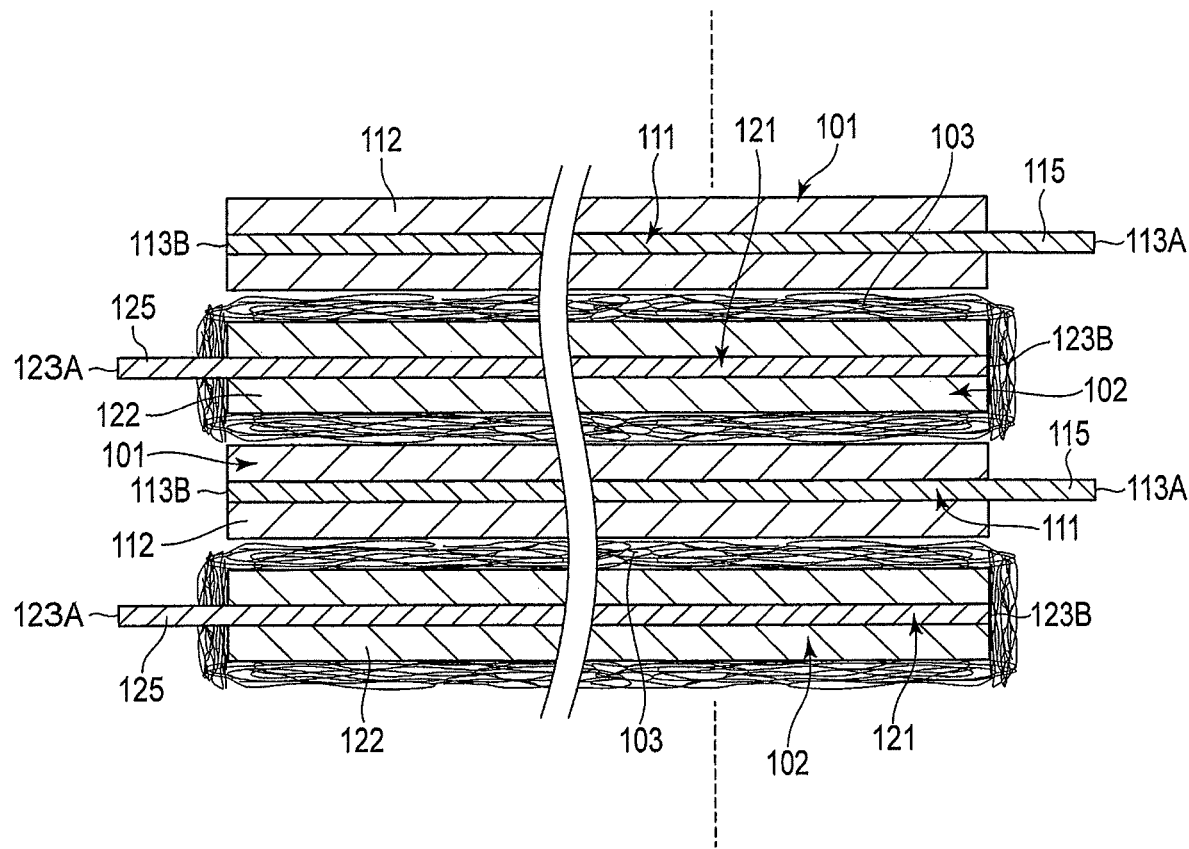
FIG. 5 is a cross-sectional view schematically showing a laminated state of positive electrodes and negative electrodes in the electrode group of FIG. 4.

The electrode group 100 includes a positive electrode 101 and a negative electrode 102. FIG. 5 shows the laminated state of the positive electrode 101 and the negative electrode 102 in the electrode group 100. In the electrode group 100 shown in FIGS. 4 and 5, a separator 103 is provided in addition to the positive electrode 101 and the negative electrode 102, and the separator 103 is formed integrally with the negative electrode 102. The removing apparatus 1 is used for forming a separator-integrated electrode in which the negative electrode 102 is integrated with the separator 103. The separator 103 is attached closely to and fixed to the surface of the negative electrode 102, and the separator 103 electrically insulates the positive electrode 101 from the negative electrode 102. The separator 103 is formed on the surface of the negative electrode 102 by, for example, the aforementioned electrospinning method. Thus, the separator 103 is formed of the aforementioned organic material filled inside the spinning head (not shown). Accordingly, if the separator 103 is formed integrally with the negative electrode 102 by, for example, the electrospinning method, the negative electrode 102 is the base 52, and the separator 103 is the sheet 53 which includes the organic fiber and is formed on the surface of the negative electrode 102. The description below will describe a case where the separator 103 is formed on the negative electrode 102; however, the same configuration applies to a case where the separator 103 is formed on the surface of the positive electrode 101 by, for example, the electrospinning method.

The positive electrode 101 includes a positive electrode current collecting foil 111 as a positive electrode current collector, and a positive electrode active material-containing layer 112 supported on the surface of the positive electrode current collecting foil 111. The positive electrode current collecting foil ill is aluminum foil or aluminum alloy foil, for example, and has a thickness of about 10 μm to 20 μm. Slurry including a positive electrode active material, a binding agent, and an electro-conductive agent is applied to the positive electrode current collecting foil 111. The positive electrode active material-containing layer 112 is formed by applying the slurry to the positive electrode current collecting foil 111. The positive electrode active material may be an oxide, a sulfide, and a polymer, for example, which can occlude and release lithium. For the positive electrode active material, it is preferable to use lithium-manganese composite oxide, a lithium-nickel composite oxide, a lithium-cobalt composite oxide, and lithium iron phosphate, for example, since a high positive electrode potential can be obtained.

The negative electrode 102 includes a negative electrode current collecting foil 121 as a negative electrode current collector, and a negative electrode active material-containing layer 122 supported on the surface of the positive electrode current collecting foil 121. The negative electrode current collecting foil 121 is aluminum foil or aluminum alloy foil, for example, and has a thickness of about 10 μm to 20 μm. A slurry including a negative electrode active material, a binding agent, and an electro-conductive agent is applied to the negative electrode current collecting foil 121. The negative electrode active material-containing layer 122 is formed by applying the slurry to the negative electrode current collecting foil 121. The negative electrode active material may be a metal oxide, metal sulfide, metal nitride, and alloy, for example, which can occlude and release lithium. The negative electrode active material is preferably a material which occludes and releases lithium ions at a potential of 0.4 V or more with respect to a metal lithium potential. The reaction of aluminum or an aluminum alloy with lithium is suppressed by using the negative electrode active material having a lithium ion occlusion-and-release potential as described above, which allows usage of aluminum and an aluminum alloy for a structural member related to the negative electrode current collecting foil 121 and the negative electrode 102. Accordingly, the negative electrode may be a titanium oxide, a lithium titanium composite oxide such as lithium titanate, a tungsten oxide, an amorphous tin oxide, a tin silicon oxide, and a silicon oxide, for example. It is especially preferable to use a lithium titanium composite oxide as the negative electrode active material.

The aluminum alloy used for the positive electrode and the negative electrode preferably includes one or more kinds of elements selected from Mg, Ti, Zn, Mn, Fe, Cu and Si. The purity of aluminum and aluminum alloy may be set to 98% by weight or more, and is preferably 99.99% by weight or more. Pure aluminum having a purity of 100% can be used as a material for the positive electrode current collector and/or the negative electrode current collector. It is preferable to set the contained amount of transition metal such as nickel and chrome in aluminum and aluminum alloy to 100 ppm by weight or less (including 0 ppm by weight).

In the electrode group 100 of FIGS. 4 and 5, the positive electrode 101, the negative electrode 102, and the separator 103 are wound around a winding axis B with the separator 103 being arranged between the positive electrode 101 and the negative electrode 102. Thus, in the electrode group 100, the positive electrode 101 and the negative electrode 102 are alternately laminated with the separator 103 being interposed therebetween. The positive electrode current collecting foil 111 includes a pair of long side edges 113A and 113B, and a positive electrode current collecting tab 115 is formed in the positive electrode current collecting foil 111 by one (113A) of the long side edges 113A and 113B and its near portion. The positive electrode current collecting tab 115 is formed over a predetermined distance from the long side edge 113A in the direction along the winding axis B, and the positive electrode active material-containing layer 112 is not supported on the positive electrode current collecting tab 115. The negative electrode current collecting foil 121 has a pair of long side edges 123A and 123B, and a negative electrode current collecting tab 125 is formed in the negative electrode current collecting foil 121 by one (123A) of the long side edges 123A and 123B and its near portion. The negative electrode current collecting tab 125 is formed over a predetermined distance from the long side edge 123A in the direction along the winding axis B, and the negative electrode active material-containing layer 122 is not supported on the negative electrode current collecting tab 125.

In the electrode group 100, the positive electrode 101 and the negative electrode 102 are arranged to be shifted with respect to each other in a direction along the winding axis B. Accordingly, the positive electrode current collecting tab 115 not supporting the positive electrode active material-containing layer 112 projects to one side of the direction along the winding axis B with respect to the negative electrode 102 and the separator 103. The negative electrode current collecting tab 125 not supporting the negative electrode active material-containing layer 122 projects to the side opposite to the side to which the positive electrode current collecting tab 115 projects, with respect to the positive electrode 101 and the separator 103 in the direction along the winding axis B.

The positive electrode current collecting tab 115 is bundled by bonding the surfaces of the positive electrode current collecting foil 111 in the positive electrode current collecting tab 115 by ultrasonic welding, for example. Then, the positive electrode current collecting tab 115 is electrically connected to the positive electrode terminal of the battery via one or more positive electrode leads. Similarly, the negative electrode current collecting tab 125 is bundled by bonding the surfaces of the negative electrode current collecting foil 121 in the negative electrode current collecting tab 125 by ultrasonic welding, for example. Then, the negative electrode current collecting tab 125 is electrically connected to the negative electrode terminal of the battery via one or more negative electrode leads. If the exterior covering member of the battery is a metal container, the positive electrode current collecting tab 115, the negative electrode current collecting tab 125, the positive electrode lead, the negative electrode lead, the positive electrode terminal, and the negative electrode terminal are insulated from the exterior covering member. The electrode terminals such as the positive electrode terminal and the negative electrode terminal are provided to be exposed to the outside of the exterior covering member.

In manufacture of the electrode group 100, the separator 103 is formed on the negative electrode 102, for example, by the electrospinning method, etc. before winding the positive electrode 101 and the negative electrode 102. In the negative electrode 102, a slurry including the negative electrode active material is applied to the negative electrode current collecting foil 121 before forming the separator 103 by the electrospinning method, for example. At this time, the slurry including the negative electrode active material is not applied to one (123A) of the long side edges 123A and 123B and its near portion, namely, a portion in which the negative electrode current collecting tab 125 is formed. Thus, the negative electrode active material-containing layer 122 is formed on a portion of the surface of the negative electrode current collecting foil 121 other than the portion in which the negative electrode current collecting tab 125 is formed.

Figure 6:
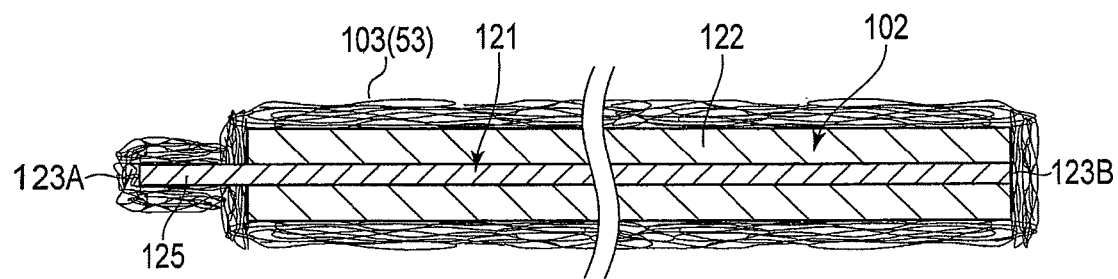
FIG. 6 is a cross-sectional view schematically showing the state of a negative electrode during formation of the electrode group of FIG. 4 after forming a sheet of organic fiber and before performing processing by the removing apparatus.

When the separator 103 is formed integrally with the negative electrode 102 by the electrospinning method, for example, the sheet 53 including organic fiber is formed on the surface of the negative electrode 102. FIG. 6 shows a state of the negative electrode 102 after forming the sheet 53 (separator 103) including the organic fiber by the electrospinning method, for example, and before performing the processing by the removing apparatus (scraping device) 1. As shown in FIG. 6, in the formation of the sheet 53 by the electrospinning method, for example, the sheet 53 including organic fiber is formed on the entire surface of the negative electrode 102. Thus, right after the formation of the sheet 53, the sheet 53 covers both of the portion of the negative electrode current collecting foil 121 supporting the negative electrode active material-containing layer 122 and its adjacent (continuing) portion not supporting the negative electrode active material-containing layer 122. Accordingly, until the processing of the removing apparatus 1, the sheet 53 covers the portion forming the negative electrode current collecting tab 125.

Figure 7:
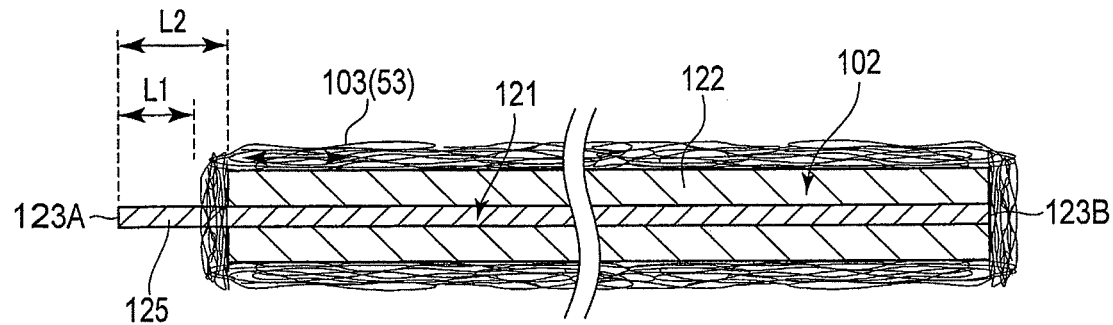
FIG. 7 is a cross-sectional view schematically showing a state of the negative electrode during formation of the electrode group of FIG. 4 right after completing the processing by the removing apparatus.

Then, after the sheet 53 is formed as described above, the organic fiber is scraped off from a part of the sheet 53 by the removing apparatus 1. FIG. 7 shows a state of the negative electrode 102 right after completing the processing by the removing apparatus 1. As shown in FIG. 7, in the removing apparatus 1, the organic fiber is scraped off from a part of the portion forming the negative electrode current collecting tab 125. At this time, the organic fiber is scraped off from the negative electrode current collecting foil 121 over a predetermined length L1 from the long side edge 123A of the negative electrode current collecting foil 121 on the side of the negative electrode current collecting tab 125. Herein, the predetermined length L1 is smaller than a length L2 from the long side edge 123A of the negative electrode current collecting foil 121 on the side of the negative electrode current collecting tab 125 to the end of the negative electrode active material-containing layer 122 on the side of the negative electrode current collecting tab 125. Accordingly, the sheet 53 is not scraped off from the portion that carries the negative electrode active material-containing layer 122. Therefore, even after the processing by the removing apparatus 1, the portion that supports the negative electrode active material-containing layer 122 is covered with the sheet 53 (separator 103). Furthermore, the organic fiber is not scraped off from the entire part of the negative electrode current collecting tab 125 that does not carry the negative electrode active material-containing layer 122. Thus, even after completing the processing by the removing apparatus 1, the sheet 53 including the organic fiber covers the part of the negative electrode current collecting tab 125 which is near the negative electrode active material-containing layer 122.

As described above, in the removing apparatus 1, the sheet 53 is scraped off from a part of the negative electrode current collecting tab 125 of the negative electrode 102. In the removing apparatus 1 of the present embodiment, the sheet 53 is prevented from being removed by the organic fiber caught on each of the rotors 16A and 16B. Accordingly, in the negative electrode 102, the sheet 53 is effectively prevented from being removed from a portion which supports the negative electrode active material-containing layer 122. In other words, by using the removing apparatus 1 of the present embodiment, the organic fiber is appropriately scraped off from only a portion of the negative electrode current collecting tab 125 which does not support the negative electrode active material-containing layer 122 in a separator-integrated electrode where the negative electrode 102 is integrated with the separator 103.

Verification Related to Embodiment

The operation and advantageous effect of the removing apparatus 1 of the above embodiment are verified. In the verification, organic fiber is scraped off from a part of the sheet 53 in the processing target 50 by using a cleaner head 2 and a removing apparatus 1 similar to those in the first embodiment. A base 52 similar to the aforementioned negative electrode 102 is used as the processing target 50, and the sheet 53 including the organic fiber is formed by the electrospinning method. Polyimide is used as an organic material for forming the organic fiber, and N-methylpyrrolidone (NMP) is used as a solvent in which the organic material is dissolved. When forming the sheet 53 by the electrospinning method, the voltage between the spinning head and the base 52 is set to 30 kV. Aluminum alloy foil having a thickness of 15 μm is used as the negative electrode current collecting foil 121 for forming the base 52. Lithium titanate having a spinel structure is used as the negative electrode active material.

In the verification, the organic fiber is scraped off from the sheet 53 continuously over 2000 m. In this verification, even right after the scraping of the organic fiber continuously over 2000 m, little organic fiber is caught on the outer peripheral surface 22A of the rotor 16A and the outer peripheral surface 22B of the rotor 16B. As a result, it is verified that the sheet 53 is effectively prevented from being scraped off by the organic fiber caught on the rotors 16A and 16B in the removing apparatus 1 of the present embodiment. Accordingly, it is proved that the organic fiber is appropriately scraped off from a portion of the sheet 53 of the processing target 50 which is in contact with the outer peripheral surface 21 (brush bristles 27) of the rotor 15, namely, a desired portion.

Modification

Figure 8:
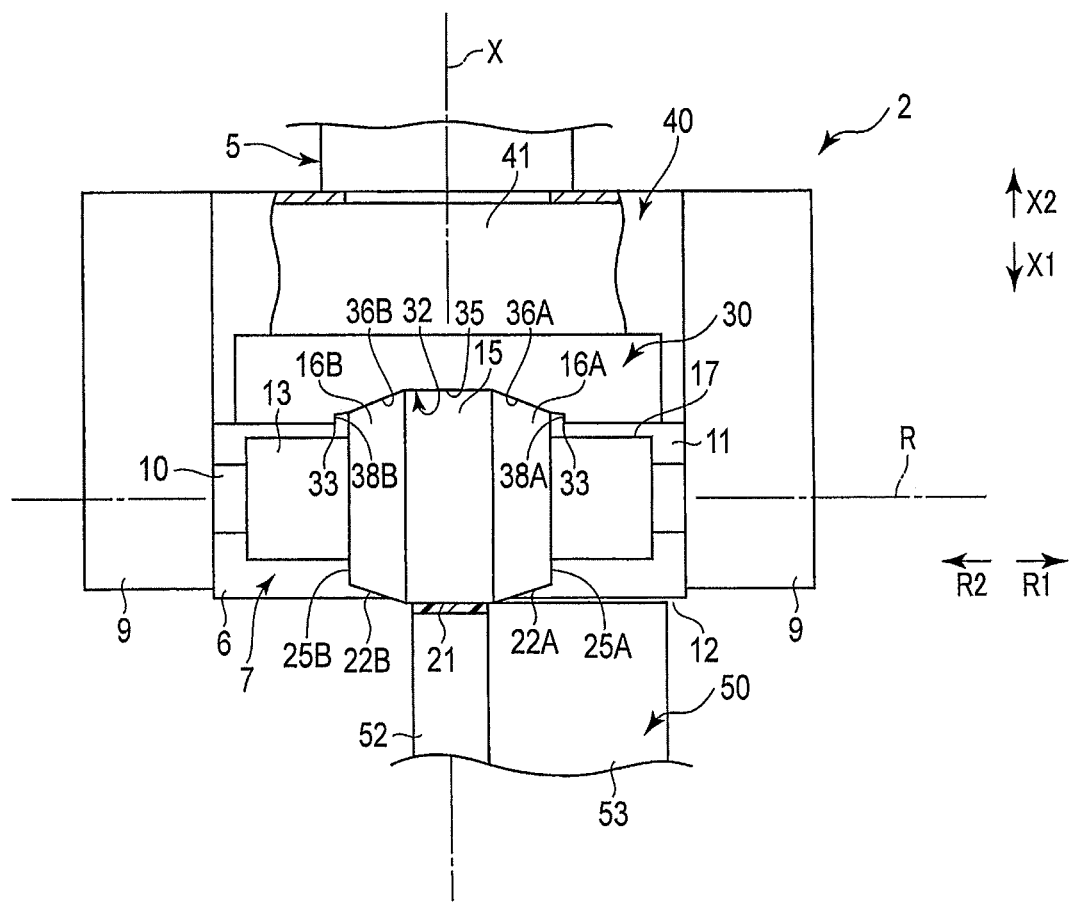
FIG. 8 is a schematic diagram showing a constitution of a cleaner head of a removing apparatus according to a modification of the first embodiment.

In the modification shown in FIG. 8, the step surface 23A is not formed between the outer peripheral surface 21 of the rotor (first rotor) 15 and the outer peripheral surface 22A of the rotor (second rotor) 16A, and the step surface 23B is not formed between the outer peripheral surface 21 of the rotor 15 and the outer peripheral surface 22B of the rotor (second rotor) 16B. However, also in the present modification, a step surface 25A is formed between the outer peripheral surface 22A of the rotor 16A and the outer peripheral surface 17 of the rotation base 13 by the rotor 16A. Furthermore, a step surface 25B is formed between the outer peripheral surface 22B of the rotor 16B and the outer peripheral surface 17 of the rotation base 13 by the rotor 16B. In the present modification, the outer peripheral surface 22A of the rotor 16A is extended from the outer peripheral surface 21 of the rotor 15 to the step surface 25A. The outer peripheral surface 22B of the rotor 16B is extended from the outer peripheral surface 21 of the rotor 15 to the step surface 25B.

In the present modification, the outer diameter of the rotor 16A is smaller as a position is further away from the rotor 15 in the rotation axis direction along the rotation axis R. Accordingly, the outer peripheral surface 22A of the rotor 16A is formed into a tapered surface of which distance from the rotation axis R is smaller as a position is further away from the rotor 15 in the rotation axis direction. Similarly, the outer diameter of the rotor 16B is smaller as a position is further away from the rotor 15 in the rotation axis direction along the rotation axis R. Accordingly, the outer peripheral surface 22B of the rotor 16B is formed into a tapered surface of which distance from the rotation axis R is smaller as a position is further away from the rotor 15 in the rotation axis direction. Because of the above configuration, also in the present modification, the rotor (second rotor) 16A rotates together with the rotor (first rotor) 15 without being in contact with the sheet 53 of the processing target 50. Similarly, the rotor (second rotor) 16B rotates together with the rotor 15 without being in contact with the sheet 53 of the processing target 50. Accordingly, also in the present modification, each of the rotors 16A and 16B is effectively prevented from coming into contact with the sheet 53.

Moreover, also in the present modification, a plate 30 is provided at a position (angle position) away from the opening 12 (sheet 53) around the rotation axis R. A groove 32 is formed on a plate facing surface 31 of the plate 30. Also in the present modification, a groove 32 has an opening edge 33, and the aforementioned contact surface (second contact surface) 35, the contact surfaces (first contact surface) 36A and 36B, and the groove side surfaces 38A and 38B. Similarly to the aforementioned embodiment, etc., the groove side surface 38A is not in contact with the rotor 16A, and there is a gap between the groove side surface 38A and the step surface 25A of the rotor 16A. The groove side surface 38B is not in contact with the rotor 16B, and there is a gap between the groove side surface 38B and the step surface 25B of the rotor 16B.

However, in the present modification, a step surface 37A is not formed between the contact surface 35 and the contact surface 36A, and a step surface 37B is not formed between the contact surface 35 and the contact surface 36B. In the present modification, the contact surface 36A is continuously extended from the contact surface 35 to the groove side surface 38A. The contact surface 36B is continuously extended from the contact surface 35 to the groove side surface 38B.

In the present modification, the depth of the groove 32 is smaller as a portion of the contact surface 36A is further away from the contact surface 35 in the rotation axis direction along the rotation axis R. Accordingly, the contact surface 36A is formed into an inclined surface in which a distance from the opening of the groove 32 is smaller as a position is further away from the rotor 15 in the rotation axis direction. Similarly, the depth of the groove 32 is smaller as a portion of the contact surface 36B is further away from the contact surface 35 in the rotation axis direction along the rotation axis R. Accordingly, the contact surface 36B is formed into an inclined surface in which a distance from the opening of the groove 32 is smaller as a position is further away from the rotor 15 in the rotation axis direction.

Also in the present modification, the contact surface is in contact with the outer peripheral surface 21 (brush bristles 27) of the rotor 15 at a position away from the opening 12 (sheet 53) around the rotation axis R. Thus, a part of or all of the organic fiber caught on the outer peripheral surface 21 of the rotor 15 is removed through the contact between the contact surface 35 and the outer peripheral surface 21 while the rotor 15 is rotating.

Also in the present modification, the contact surface 36A is in contact with the outer peripheral surface 22A of the rotor 16A at a position away from the opening 12 (sheet 53) around the rotation axis R. Thus, a part of or all of the organic fiber caught on the outer peripheral surface 22A of the rotor 16A is removed through the contact between the contact surface 36A and the outer peripheral surface 22A of the rotor 16A while the rotor 16A is rotating together with the rotor 15. Similarly, the contact surface 36B is in contact with the outer peripheral surface 22B of the rotor 16B at a position away from the opening 12 (sheet 53) around the rotation axis R. Thus, a part of or all of the organic fiber caught on the outer peripheral surface 22B of the rotor 16B is removed through the contact between the contact surface 36B and the outer peripheral surface 22B of the rotor 16B while the rotor 16B is rotating together with the rotor 15.

Also in the present modification, similarly to the aforementioned embodiment, the organic fiber caught on each of the outer peripheral surface 22A of the rotor 16A and the outer peripheral surface 22B of the rotor 16B is removed. Therefore, the organic fiber is prevented from being caught on the outer peripheral surface 22A of the rotor 16A and the outer peripheral surface 22B of the rotor 16D in large amounts, and the caught organic fiber is prevented from interfering with the sheet 53. Thus, also in the present modification, similarly to the aforementioned embodiment, the sheet 53 is prevented from being removed by the organic fiber caught on each of the rotors 16A and 16D. As a result, the organic fiber is removed only from a portion of the sheet 53 of the processing target 50 with which the outer peripheral surface 21 (brush bristles 27) of the rotor 15 comes into contact, namely, only from a desired portion of the sheet 53.

According to the cleaner head of at least one of the embodiments or the working examples, a second rotor is arranged next to a first rotor in a direction along the rotation axis of the first rotor, and the second rotor rotates together with the first rotor without being in contact with a sheet. A contact surface is in contact with the outer peripheral surface of the second rotor at a position away from the sheet around the rotation axis. Thus, it is possible to provide a cleaner head in which a sheet (organic fiber) formed on a base is removed only from a desired portion of the base.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cleaner head comprising:
   an outer cover inside which a storing space is formed, the storing space being open to an outside of the outer cover at an opening;
   a first rotor that is stored in the storing space of the outer cover, and can be rotationally driven about a rotation axis, the first rotational rotor being rotationally driven in a state where an outer peripheral surface of the first rotor is configured to be in contact with a sheet at the opening of the storing space so that the first rotor is configured to remove a part of the sheet from a base;
   a second rotor that is stored in the storing space of the outer cover, and that is provided next to the first rotor in a direction along the rotation axis of the first rotor, the second rotor being rotated together with the first rotor about the rotation axis by the rotational drive of the first rotor, an outer diameter of the second rotor being smaller than an outer diameter of the first rotor so that the second rotor is not in contact with the sheet when the first rotor is in contact with a sheet at the opening of the storing space; and
   a first contact surface that is arranged in the storing space inside the outer cover, and that is in contact with an outer peripheral surface of the second rotor at a position away from the opening of the storing space.

2. The cleaner head according to claim 1, wherein the second rotor is adjacent to the first rotor in the direction along the rotation axis.

3. The cleaner head according to claim 1, wherein the first rotor includes a plurality of brush bristles on the outer peripheral surface of the first rotor.

4. The cleaner head according to claim 1, wherein the second rotor includes a plurality of brush bristles on the outer peripheral surface of the second rotor, and the first contact surface is in contact with the brush bristles of the second rotor at a position away from the base and the sheet around the rotation axis.

5. The cleaner head according to claim 1, further comprising a plate on which the first contact surface is formed, wherein
   the plate includes a second contact surface that is in contact with the outer peripheral surface of the first rotor at a position away from the base and the sheet around the rotation axis, and that is provided on a portion different from the first contact surface, and
   the second contact surface can remove a part of or all of the sheet removed from the base and caught on the outer peripheral surface of the first rotor through a contact with the outer peripheral surface of the first rotor while the first rotor is rotating.

6. The cleaner head according to claim 5, wherein
   the plate includes a groove recessed toward a side away from the rotation axis of the first rotor,
   the first rotor and the second rotor are inserted in the groove,
   the first contact surface is formed in the groove, and is in contact with the outer peripheral surface of the second rotor in the groove, and
   the second contact surface is formed in the groove, and is in contact with the outer peripheral surface of the first rotor in the groove.

7. A removing apparatus comprising:
   a cleaner head comprising:
      an outer cover inside which a storing space is formed, the storing space being open to an outside of the outer cover at an opening;
      a first rotor that is stored in the storing space of the outer cover, and can be rotationally driven about a rotation axis, the first rotational rotor being rotationally driven in a state where an outer peripheral surface of the first rotor is configured to be in contact with a sheet at the opening of the storing space so that the first rotor is configured to remove a part of the sheet from a base;
      a second rotor that is stored in the storing space of the outer cover, and that is provided next to the first rotor in a direction along the rotation axis of the first rotor, the second rotor being rotated together with the first rotor about the rotation axis by the rotational drive of the first rotor, an outer diameter of the second rotor being smaller than an outer diameter of the first rotor so that the second rotor is not in contact with the sheet when the first rotor is in contact with a sheet at the opening of the storing space; and
      a first contact surface that is arranged in the storing space inside the outer cover, and that is in contact with an outer peripheral surface of the second rotor at a position away from the opening of the storing space;
   a suction source configured to be actuated so that suction force from the opening to the storing space and suction force from the storing space to the suction source act; and
   a collection tank into which an aspirate as a result of the suction by the suction source is collected.

* * * * *